US011695836B2

(12) United States Patent
Murai et al.

(10) Patent No.: US 11,695,836 B2
(45) Date of Patent: Jul. 4, 2023

(54) RECORDING MEDIUM, INFORMATION PROCESSING METHOD, INFORMATION PROCESSING DEVICE, AND INFORMATION PROCESSING SYSTEM

(71) Applicant: C-RISE Ltd., Takaoka (JP)

(72) Inventors: Masanori Murai, Kanazawa (JP); Yutaka Mitsubayashi, Kanazawa (JP)

(73) Assignee: C-RISE Ltd., Takaoka (JP)

( * ) Notice: Subject to any disclaimer, the term of this patent is extended or adjusted under 35 U.S.C. 154(b) by 31 days.

(21) Appl. No.: 17/049,850

(22) PCT Filed: Jun. 18, 2020

(86) PCT No.: PCT/JP2020/023896
§ 371 (c)(1),
(2) Date: Oct. 22, 2020

(87) PCT Pub. No.: WO2021/049120
PCT Pub. Date: Mar. 18, 2021

(65) Prior Publication Data
US 2021/0281647 A1 Sep. 9, 2021

(30) Foreign Application Priority Data

Sep. 11, 2019 (JP) ................. 2019-165565

(51) Int. Cl.
*G06F 15/16* (2006.01)
*H04L 67/141* (2022.01)
(Continued)

(52) U.S. Cl.
CPC ............ *H04L 67/141* (2013.01); *H04L 67/02* (2013.01); *H04L 67/55* (2022.05)

(58) Field of Classification Search
CPC ........ H04L 67/141; H04L 67/02; H04L 67/26
(Continued)

(56) References Cited

U.S. PATENT DOCUMENTS

2003/0088421 A1* 5/2003 Maes ...................... G10L 15/30
704/E15.047
2008/0091812 A1* 4/2008 Lev-Ran ................. H04L 67/51
709/224
2018/0278624 A1* 9/2018 Kuperman ............ G06F 21/602

FOREIGN PATENT DOCUMENTS

JP 2002-342152 A 11/2002
JP 2019-074889 A 5/2019
JP 6532626 B1 6/2019

OTHER PUBLICATIONS

English translation of International Search Report for PCT/JP2020/023896 dated Jul. 14, 2020, 2 pages.

* cited by examiner

*Primary Examiner* — Suraj M Joshi
*Assistant Examiner* — Joel Mesa
(74) *Attorney, Agent, or Firm* — Peter W. Schroen; Bret E. Field; Bozicevic, Field & Francis LLP

(57) ABSTRACT

A computer program and the like are provided that are capable of causing an information processing device connected to a private network, to automatically execute operation processing of a browser.
The computer program is a computer program for causing the information processing device connected to the private network, to automatically execute the operation of the browser that accesses a web server on the private network, based on an instruction from a server connected to a global network, and causes the information processing device to execute the processing of: requesting the server to establish a connection; obtaining an operation instruction related to the operation processing which is push-transmitted from the server, by using the connection; executing the operation processing of the browser based on the obtained operation
(Continued)

instruction; obtaining an execution result of the operation processing; and outputting the obtained execution result to the server.

13 Claims, 12 Drawing Sheets

(51) Int. Cl.
    *H04L 67/02*           (2022.01)
    *H04L 67/55*           (2022.01)

(58) Field of Classification Search
    USPC .......................................................... 709/223
    See application file for complete search history.

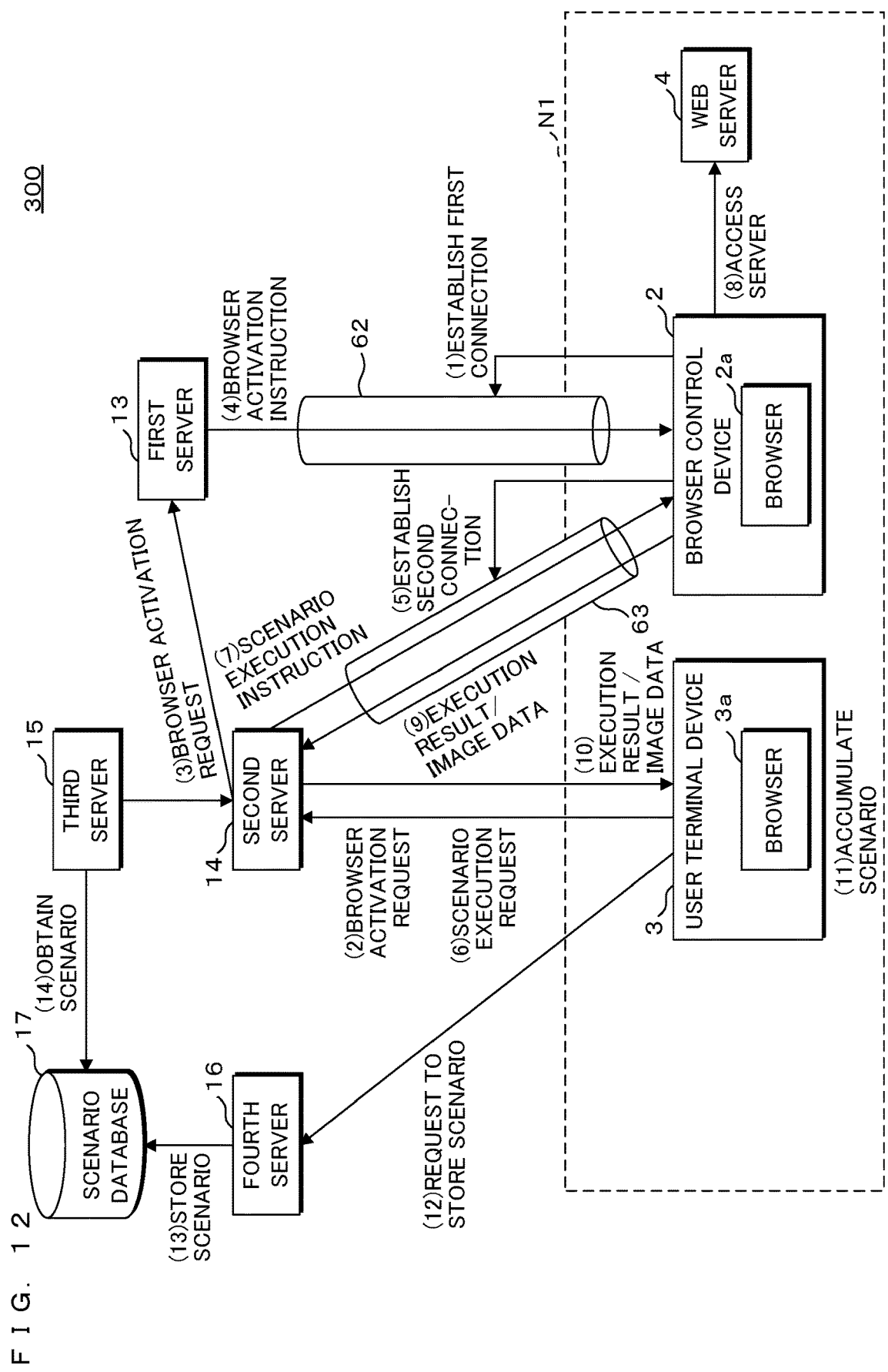
F I G. 1 2

RECORDING MEDIUM, INFORMATION PROCESSING METHOD, INFORMATION PROCESSING DEVICE, AND INFORMATION PROCESSING SYSTEM

CROSS-REFERENCE TO RELATED APPLICATIONS

This application is the national phase under 35 U.S.C. § 371 of PCT International Application No. PCT/JP2020/023896 which has an International filing date of Jun. 18, 2020 and designated the United States of America.

FIELD

The present technology relates to a recording medium, an information processing method, an information processing device and an information processing system.

BACKGROUND

As a cloud service intended to increase the efficiency of work in offices, factories or the like, a method for automating a work process of performing an operation on a server on an intra-company network is disclosed in Japanese Patent No. 6532626.

SUMMARY

In a cloud service provided through communication between an information processing device connected to a private network and a server connected to a global network, it is expected that availability is further improved while security is secured.

An object of the present disclosure is to provide a computer program and the like capable of causing an information processing device connected to a private network, to automatically execute an operation of a browser.

A computer program according to an aspect of the present disclosure causes an information processing device connected to a private network, to automatically execute operation processing of a browser that accesses a web server on the private network, based on an instruction from a server connected to a global network. The computer program causes the information processing device to execute the processing of: requesting the server to establish a connection; obtaining an operation instruction related to the operation processing which is push-transmitted from the server, by using the connection; executing the operation processing of the browser based on the obtained operation instruction; obtaining an execution result of the operation processing; and outputting the obtained execution result to the server. That is, the computer program causes an information processing device to be connected to a private network, to automatically execute operation processing of a browser that accesses a web server on the private network, based on an instruction from a server to be connected to a global network.

An information processing method according to an aspect of the present disclosure causes an information processing device connected to a private network, to automatically execute operation processing of a browser that accesses a web server on the private network, based on an instruction from a server connected to a global network. The information processing method comprises: requesting the server to establish a connection; obtaining an operation instruction related to the operation processing which is push-transmitted from the server, by using the connection; executing the operation processing of the browser based on the obtained operation instruction; obtaining an execution result of the operation processing; and outputting the obtained execution result to the server.

An information processing device according to an aspect of the present disclosure is connected to a private network, and for being caused to automatically execute operation processing of a browser that accesses a web server on the private network, based on an instruction from a server connected to a global network. The information processing device comprises: a request portion that requests the server to establish a connection; an operation instruction obtaining portion that obtains an operation instruction related to the operation processing which is push-transmitted from the server, by using the connection; an execution portion that executes the operation processing of the browser based on the obtained operation instruction; an execution result obtaining portion that obtains an execution result of the operation processing; and an output portion that outputs the obtained execution result to the server.

An information processing system according to an aspect of the present disclosure, comprises: an information processing device connected to a private network, and to be accessible to a web server; and a server connected to a global network, and outputting an operation instruction related to operation processing of a browser that accesses the web server, to the information processing device by using a connection established by responding to a request from the information processing device. The information processing device comprises: a request portion that requests the server to establish the connection; an operation instruction obtaining portion that obtains the operation instruction push-transmitted from the server, by using the connection; an execution portion that executes the operation processing of the browser based on the obtained operation instruction; an execution result obtaining portion that obtains an execution result of the operation processing; and an output portion that outputs the obtained execution result to the server.

According to the present disclosure, a computer program and the like can be provided that are capable of causing an information processing device connected to a private network, to automatically execute an operation of a browser.

The above and further objects and features will more fully be apparent from the following detailed description with accompanying drawings.

BRIEF DESCRIPTION OF THE DRAWINGS

FIG. 12 is a view showing a general outline of an information processing system in a third embodiment.

DETAILED DESCRIPTION OF NON-LIMITING EXAMPLE EMBODIMENTS

The present disclosure will be concretely described with reference to the drawings showing embodiments thereof.

First Embodiment

Figure 1:
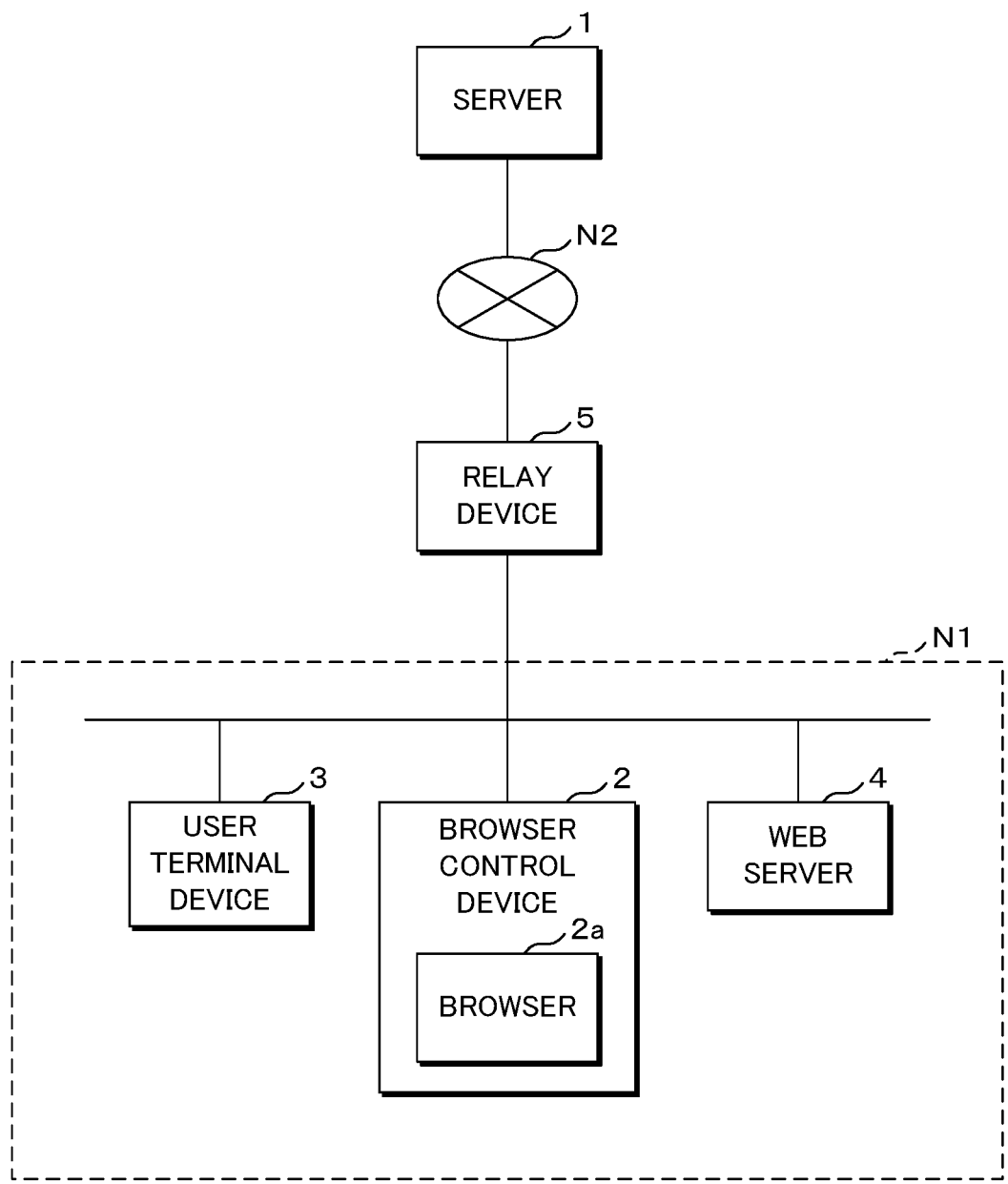
FIG. 1 is a view showing a general outline of an information processing system in a first embodiment.

FIG. 1 is a view showing a general outline of an information processing system 100 in a first embodiment. The information processing system 100 includes a server 1, a browser control device 2, a user terminal device 3 and a web server 4. The browser control device 2, the user terminal device 3 and the web server 4 are connected to a private network N1. The server 1 is connected to a global network N2 such as the Internet, and is communicably connected with the browser control device 2 and the user terminal device 3 on the private network N1 through a relay device 5 to transmit and receive information.

In the information processing system 100, an automatic execution service is realized in which in response to a request from the user terminal device 3, the browser control device 2 automatically executes various operation processing on the web server 4 through the server 1 and the execution result is provided to the user terminal device 3.

The server 1 is, for example, a server computer. While the server 1 will be described as one server computer in the following in the first embodiment, the function or the processing may be distributed to a plurality of server computers or the server 1 may be one of a plurality of server computers (instances) virtually generated in one large-sized computer. The server 1 is provided with a scenario database (not shown) storing scenarios for the operation processing executed by the automatic execution service. The scenarios are, for example, JSON (Javascript [registered trademark] Object Notation) format data, and each include data related to the procedure of the operation processing of the browser.

The operation processing automatically executed based on the scenarios is, for example, access to the web server 4, input of data on the web server 4, selection of an element, resizing of the browser, scrolling of the browser and tab switching. With reference to the scenario database, the server 1 transmits an operation instruction to perform these operation processing to the browser control device 2.

The browser control device 2 is a device that performs automatic execution of the operation processing by the automatic execution service, and is, for example, a personal computer or a server computer. The browser control device 2 is provided with a browser 2a. The browser 2a performs communication with the web server 4, analyzes the information obtained from the web server 4, and displays the analysis result on the browser screen.

The user terminal device 3 is, for example, a personal computer, a smartphone or a tablet. The user terminal device 3 is used by the user of the automatic execution service, and obtains the execution result obtained in response to the operation processing automatically executed by the browser control device 2.

The web server 4 is a web server connected to the private network N1, and is, for example, a sales management system, a sales amount management system, a work management system or the like of the user company. The web server 4 provides a web service to each device connected to the private network N1 by using the HTTP protocol. From the web server 4 to the browser control device 2, data of, for example, the HTML (Hyper Text Markup Language) format or the XML (Extensible Markup Language) format is transmitted.

The relay device 5 is a relay device that relays communication between the private network N1 and the global network N2, and is, for example, a router or a gateway. The relay device 5 may include the function of a proxy server, a fire wall or the like. The relay device 5 has the NAT (Network Address Translation) or NAPT (Network Address Port Translation) function of interconverting the private IP (Internet Protocol) address that is available only on the private network N1 and the global IP address that is used on the global network N2. The relay device 5 relays communication between the private network N1 and the global network N2. The relay device 5 protects the private network N1 from unauthorized accesses from the global network N2.

Figure 2:
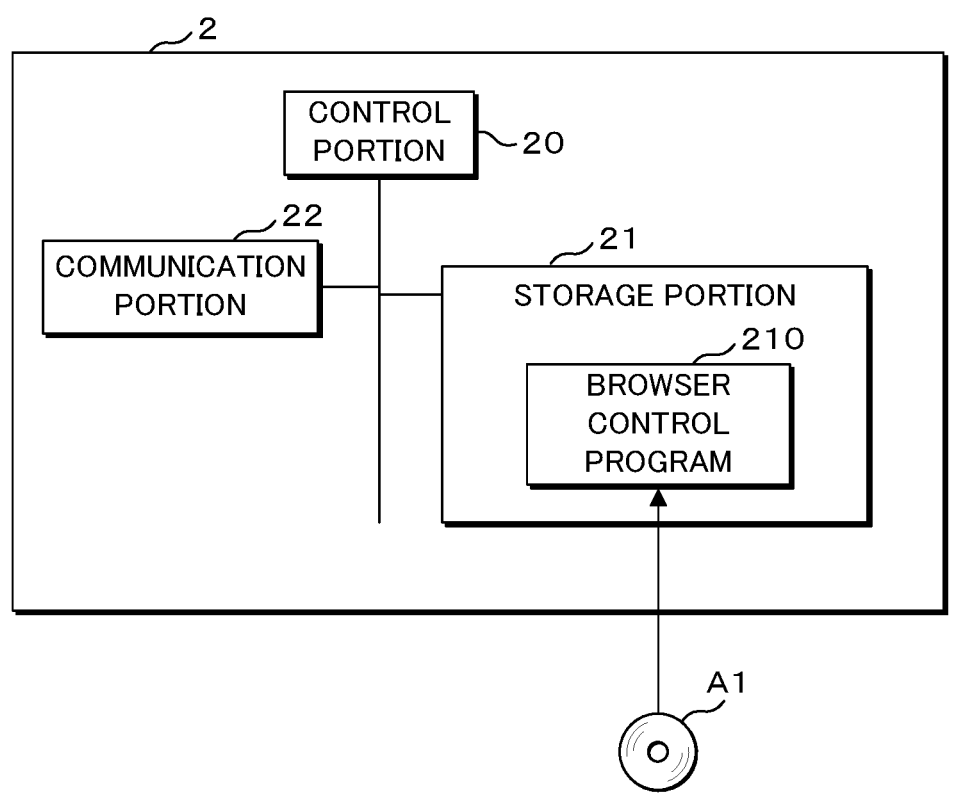
FIG. 2 is a block diagram showing the internal structure of a browser control device.

FIG. 2 is a block diagram showing the internal structure of the browser control device 2. The browser control device 2 is provided with a control portion 20, a storage portion 21 and a communication portion 22.

The communication portion 22 is a wired or wireless communication module for implementing information transmission and reception to and from the server 1 through the global network N2. The communication portion 22 is a wired or wireless communication module for implementing information transmission and reception to and from the web server 4 through the private network N1. The communication portion 22 receives the operation instruction of the scenario from the server 1 and accesses the web server 4 according to an instruction from the control portion 20. The communication portion 22 transmits the browser image data to the server 1 according to an instruction from the control portion 20.

The storage portion 21 is a nonvolatile memory. In the storage portion 21, a browser control program 210 is stored. The browser control program 210 is an application program for automatically executing the scenario operation.

The browser control program 210 may be provided to the browser control device 2 by using a non-temporary storage medium A1 readably storing the browser control program 210. The storage medium A1 is, for example, a portable memory. Examples of the portable memory include a CD-ROM, a USB (Universal Serial Bus) memory, an SD card, a micro SD card and a compact flash (registered trademark). When the storage medium A1 is a portable memory, the processing element of the control portion 20 may read the browser control program 210 from the storage medium A1 by using a non-illustrated reader and store it in the storage portion 21.

The browser control program 210 may be provided to the browser control device 2 by communication through the communication portion 22. In this case, the processing element of the control portion 20 may obtain the browser control program 210 through the communication portion 22 and store it in the storage portion 21.

The control portion 20 has a processing element (computer) such as a CPU (Central Processing Unit), an MPU (Micro-Processing Unit) or a GPU (Graphics Processing Unit). The processing element of the control portion 20 executes the browser control program 210. The number of processing elements that the control portion 20 has may be two or more. In this case, a plurality of processing elements execute various kinds of processing in cooperation.

Figure 3:
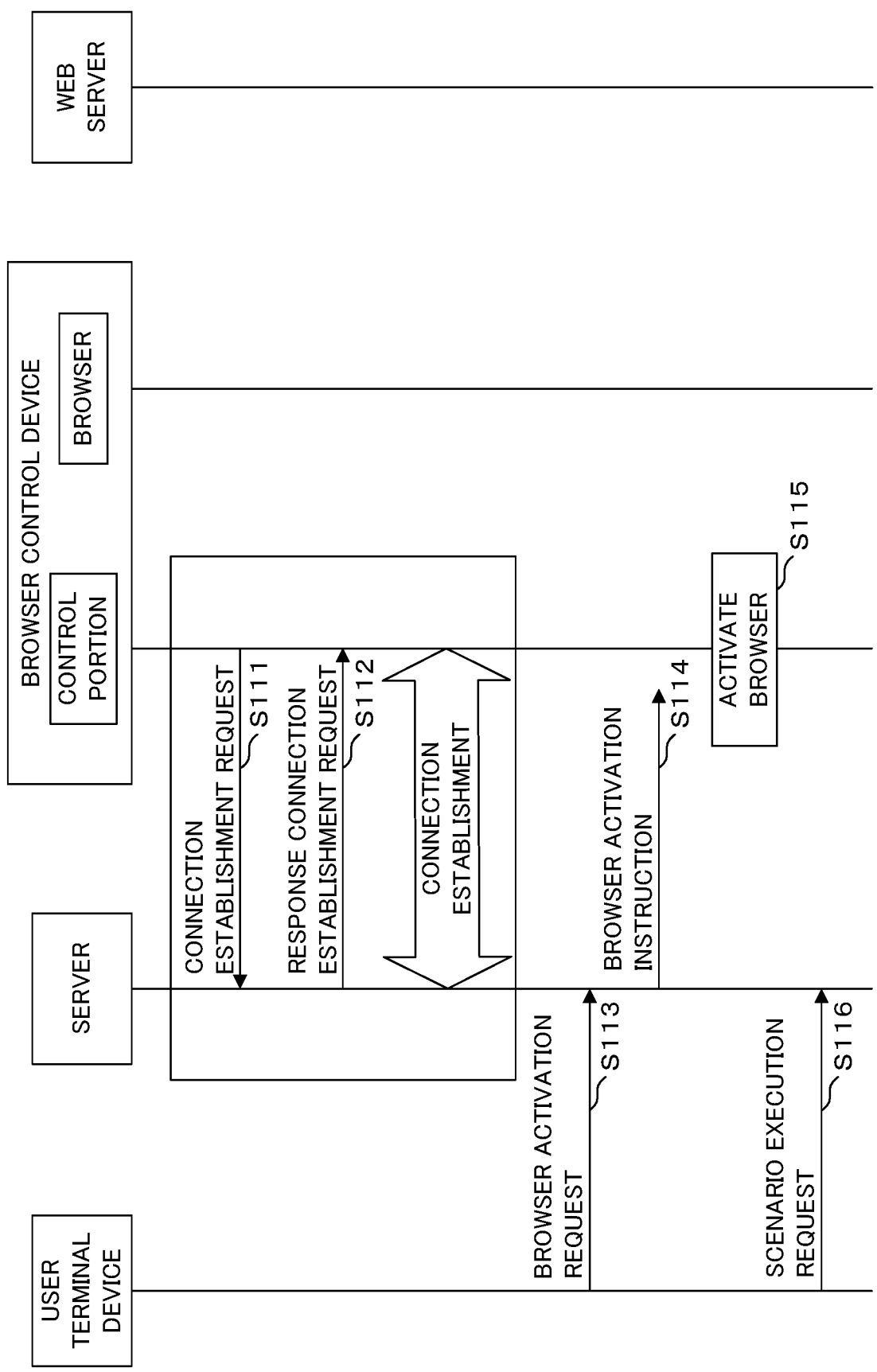
FIG. 3 is a sequence diagram showing an example of the procedure of an operation executed in the information processing system.
Figure 4:
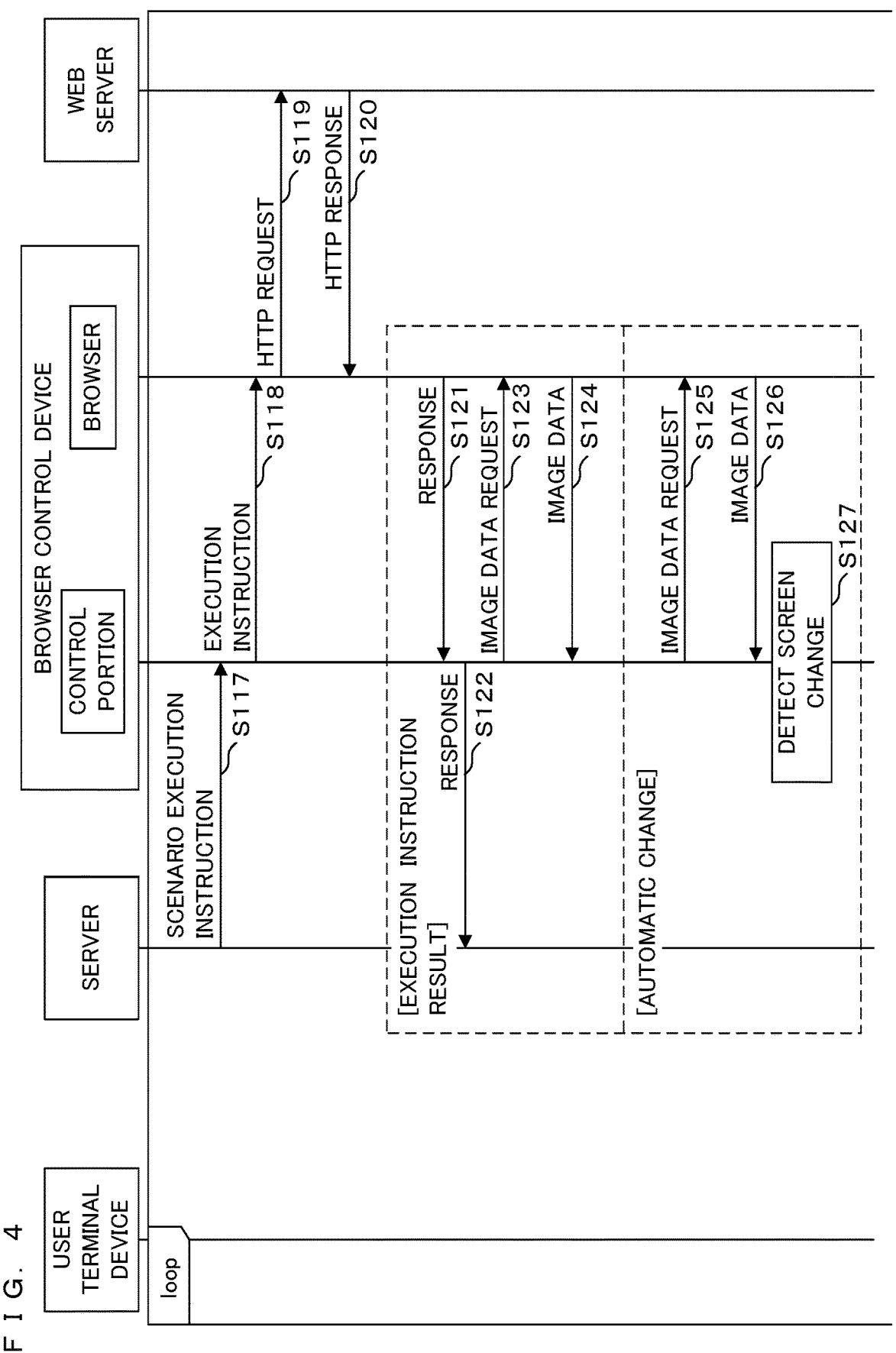
FIG. 4 is a sequence diagram showing the example of the procedure of the operation executed in the information processing system.
Figure 5:
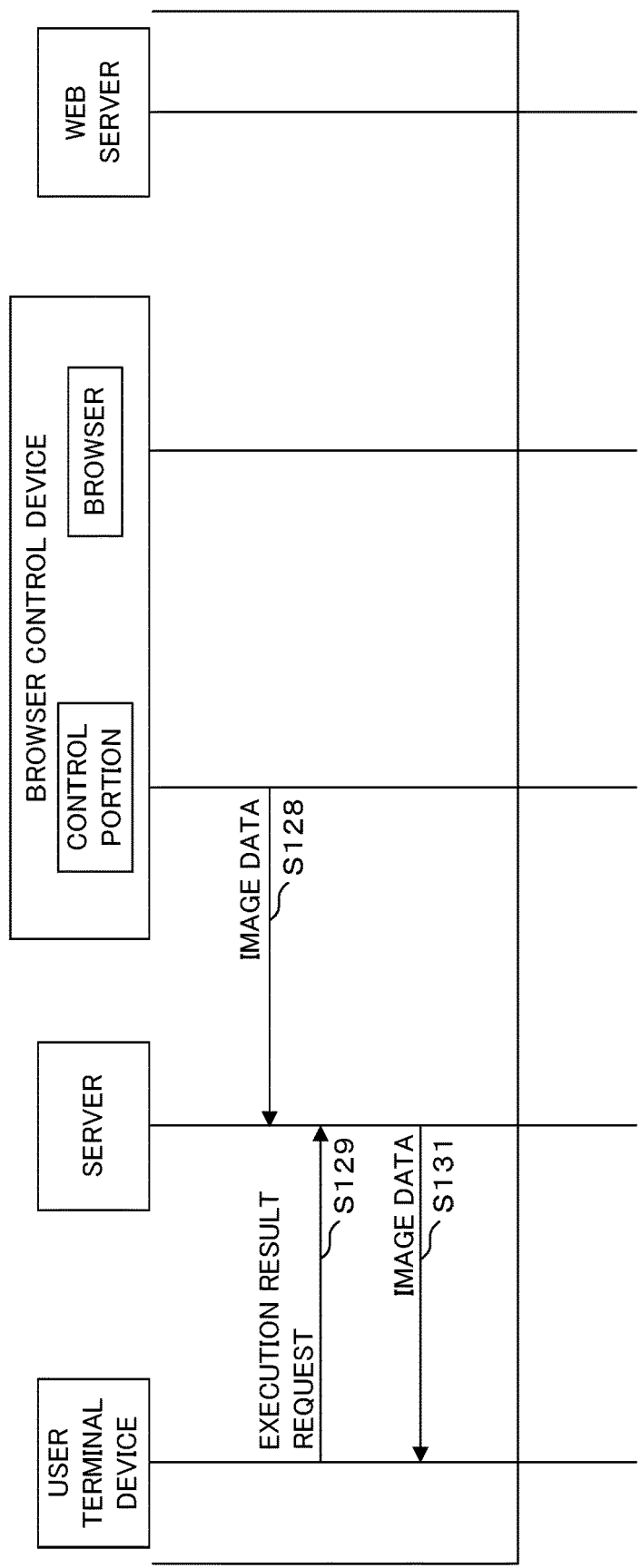
FIG. 5 is a sequence diagram showing the example of the procedure of the operation executed in the information processing system.

In the information processing system 100 structured as described above, the automatic execution of the operation processing based on the scenario is performed. FIGS. 3 to 5 are sequence diagrams showing an example of the procedure of an operation executed in the information processing system 100.

When the browser control device 2 is activated, the browser control device 2 transmits a request for the establishment of a connection 61, to the server 1 through the global network N2 (step S111). The establishment request is made according to the HTTP protocol, and a protocol upgrade to Websocket, that the request is from the browser control device 2, and the like are indicated. The server 1 transmits a response to the received connection establishment request (step S112). Thereby, the connection 61 according to the Websocket protocol is established between the server 1 and the browser control device 2, which enables bidirectional communication, that is, push-type intercommunication. The subsequent communication between the server 1 and the browser control device 2 is performed by using a telegraphic message conforming to the Websocket protocol by using the connection 61. Since information transmission and reception to and from the server 1 is always allowed when the browser control device 2 is activated, the connection 61 is established with the activation of the browser control device 2 as the trigger, and the connection is continued until the system of the browser control device 2 is ended.

Normally, when a device on a global network communicates with a device within a private network, it is necessary to perform so-called NAT (Network Address Translation) traversal. In the present embodiment, NAT traversal is also necessary when communication is performed from the server 1 to the browser control device 2. In the present embodiment, NAT traversal is implemented by establishing the connection 61 in the application layer of the OSI reference model according to Websocket. When the Websocket protocol is used, a secure communication protocol such as wss (Websocket secure) to perform communication with encryption using SSL (Secure Sockets Layer)/TLS (transport Layer Security) is desirable.

After the establishment of the connection 61, the user terminal device 3 requests automatic execution of the scenario. The user terminal device 3 first transmits a browser activation request to the server 1 (step S113). From the user terminal device 3, for example, identification information of the user terminal device 3 is transmitted together with the activation request. The server 1 receives the browser activation request. The server 1 prestores a table associating with each other the user terminal device 3 that requests automatic execution of the scenario, and the browser control device 2 to be caused to execute the operation processing in response to the request from the user terminal device 3. The server 1 reads from the table the browser control device 2 to which an activation instruction is to be transmitted, and push-transmits a browser activation instruction to the read browser control device 2 through the connection 61 (step S114). The activation instruction is transmitted in a telegraphic message format defined in the Websocket protocol. Since the connection 61 is established between the server 1 and the browser control device 2, push transmission of information from the server 1 having traversed NAT to the browser control device 2 is possible.

The browser control device 2 receives the activation instruction and activates the browser 2a (step S115). Since a series of scenario operation processing is automatically executed in the browser control device 2, the browser 2a to be activated may be a headless browser. For the control of the browser 2a, a web driver or the like may be used.

Then, the user terminal device 3 transmits a scenario execution request to the server 1 (step S116). The server 1 receives the scenario execution request. The server 1 push-transmits a scenario execution instruction to the browser control device 2 through the already established connection 61 (step S117). The execution instruction is transmitted in a telegraphic message format defined in the Websocket protocol.

The browser control device 2 receives the execution instruction. Based on the received execution instruction, the browser control device 2 executes the operation processing of the browser 2a. Specifically, the browser control device 2 executes the operation processing of the browser 2a based on the execution instruction (step S118). The browser 2a transmits an HTTP request to the web server 4 (step S119), and obtains an HTTP response (step S120). The response obtained from the web server 4 is, for example, data of the HTML format. The browser control device 2 obtains a response of the browser 2a to the operation processing (step S121), and transmits the obtained response to the server 1 (step S122). The response to the execution instruction includes, for example, error information when an abnormal end occurs for the operation processing as well as the result when the operation ended normally. The browser control device 2 requests image data of the browser screen including the web page according to the operation processing on the web server 4 (step S123). The browser control device 2 obtains the image data of the browser screen (step S124). The image data is image data by a snapshot of the browser screen. Thereby, the execution result of the operation processing is obtained as the image data.

The operation processing included in the scenario may be one using a unique selector to which specifications of a general selector are extended. In the web service provided by the web server 4 which is the target of the automatically executed operation processing, when the main browser screen by the web service is one including an iframe tag, it is necessary to also automate the operation processing on an element such as an input item within the browser screen of the inline defined by the iframe tag. In this case, by obtaining selectors on both the main browser screen and the browser screen of the inline and using a unique selector which is a combination of the obtained selectors, the operation processing can be performed while an element within the browser screen of the inline defined by the iframe tag, that is, the inline frame is directly specified.

Further, the browser control device 2 periodically obtains the browser screen and detects changes of the browser screen. The browser control device 2 requests image data of the browser screen including the web page at a predetermined timing, for example, every three seconds (step S125), and obtains the image data (step S126). The browser control device 2 detects the change of the screen based on the difference from the previous screen (step S127). The browser control device 2 obtains the screen transition that changes by the processing from the web server 4 such as timeout information by the operation not being performed for a predetermined period of time. Thereby, the execution result on the detection of the automatic change is obtained as image data.

The browser control device 2 transmits the obtained image data of the execution result, the HTML source and the like to the server 1 (step S128). When it is desired to obtain the execution result, the user terminal device 3 transmits a request for the execution result to the server 1 (step S129). The server 1 transmits the received image data of the execution result to the user terminal device 3 as the response to the transmission request (step S131). The image data of the execution result transmitted to the user terminal device 3 is transmitted as part of the HTML format data. The user terminal device 3 can obtain the screen of the execution result according to the selected scenario as image data without performing a browser operation on its own terminal device. When no request for the execution result is made from the user terminal device 3, a structure may be adopted in which the server 1 does not transmit the image data of the execution result screen. A structure may be adopted in which the server 1 stores the execution result in a database, reads the execution result from the database and transmits it at a timing when a user request is obtained.

When the loop processing from step S117 to step S131 is performed so that the series of scenario operation processing is ended, the devices of the information processing system 100 end the series of processing.

In the above-described processing, the browser control device 2 may activate the browser 2a without receiving an activation instruction of the browser 2a. For example, the browser 2a may be automatically activated when the browser control device 2 is activated. The browser 2a may be automatically activated simultaneously with the activation of the browser control program 210 by the browser control program 210 and the browser 2a being integrated with each other.

Moreover, the operation instruction for the automatic execution of the scenario is not limited to the one performed at a request from the user terminal device 3. The server 1 may automatically transmit an activation instruction or an operation instruction to the browser control device 2 at a preset timing without receiving a request from the user terminal device 3.

Figure 6:
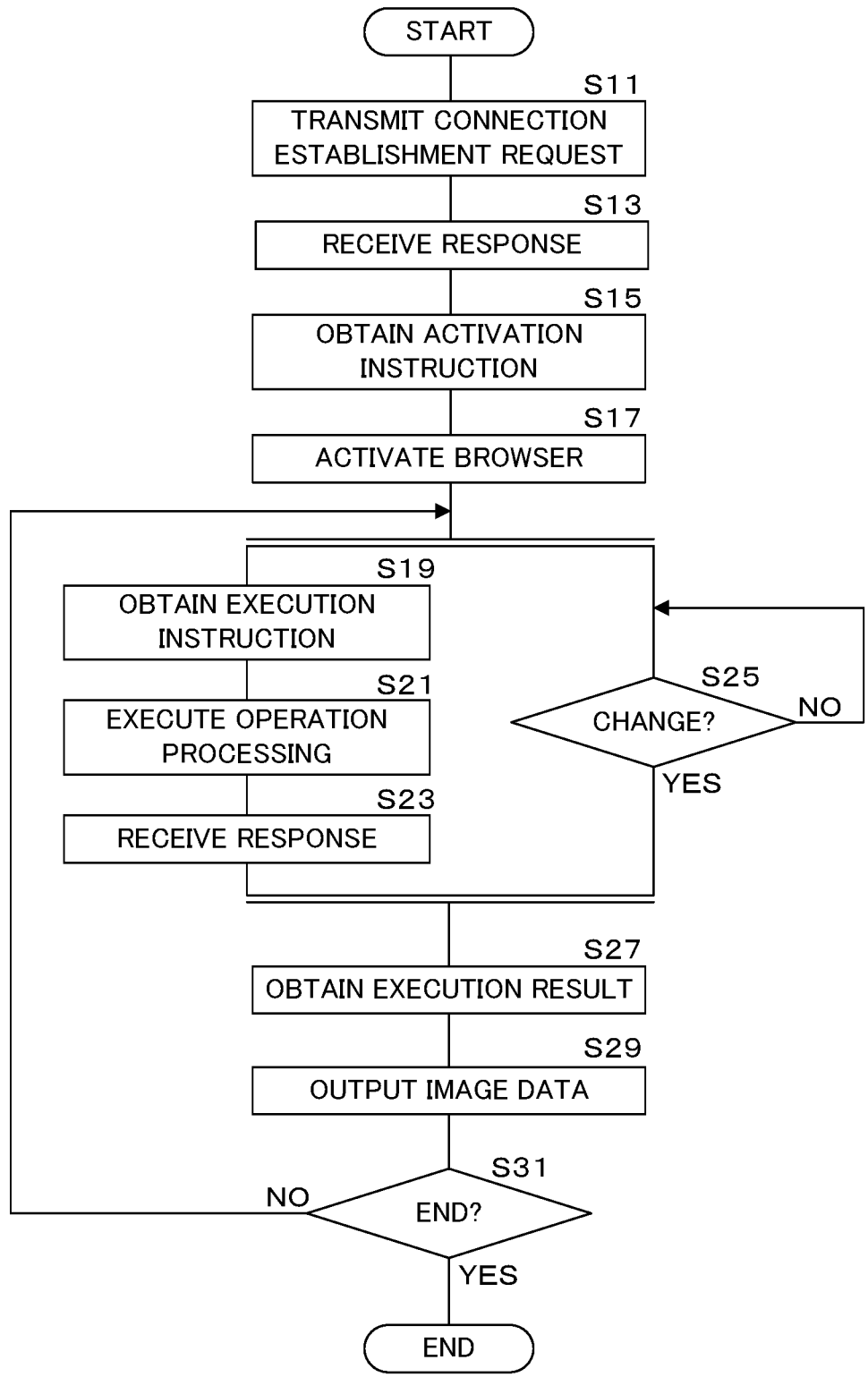
FIG. 6 is a flowchart showing an example of the procedure of the processing executed in the information processing system.

FIG. 6 is a flowchart showing an example of the procedure of the processing executed in the information processing system 100. The processing of FIG. 6 is executed by the control portion 20 of the browser control device 2. The browser control device 2 automatically executes the browser operation processing by executing the browser control program 210. The execution timing of the processing is, for example, the timing when the browser control device 2 is activated.

The control portion 20 transmits a request for the establishment of the connection 61, to the server 1 through the communication portion 22 (step S11). The control portion 20 transmits a request for the establishment of the connection 61 including information indicating that it is a request from the browser control device 2. The control portion 20 receives a response to the establishment request from the server 1 (step S13). Thereby, the connection 61 is established between the server 1 and the browser control device 2.

The control portion 20 obtains an activation instruction from the server 1 through the communication portion 22 (step S15). The activation instruction is push-transmitted from the server 1 at a given timing through the connection 61 by using a telegraphic message format determined in the Websocket protocol. The control portion 20 activates the browser 2a based on the obtained activation instruction (step S17). The browser 2a may be a headless browser activated in the background. The control portion 20 may be structured so as to activate the browser 2a without obtaining an activation instruction. For example, the control portion 20 may activate the browser 2a with the activation of the browser control program 210 or the like as the trigger.

The control portion 20 obtains an execution instruction from the server 1 through the communication portion 22 (step S19). The execution instruction is push-transmitted from the server 1 at a given timing through the connection 61 by using a telegraphic message format determined in the Websocket protocol. Based on the execution instruction, the control portion 20 accesses the web server 4 through the communication portion 22 to execute the operation processing of the scenario (step S21). The control portion 20 obtains a response of the browser 2a to the operation processing (step S23). The response includes normal completion, abnormal completion or the like of the operation processing.

The control portion 20 causes a subprocess, and performs the processing of step S25 in parallel with the processing of step S19. The control portion 20 obtains the browser screen data of the web page displayed on the browser 2a at a predetermined timing, for example, through a web driver, and compares the obtained current screen data with the previous screen data. The control portion 20 derives the difference between the current screen data and the previous screen data, and determines whether the browser screen is changed or not based on the derived difference (step S25). When a difference indicating that the browser screen is changed is not obtained and it is not determined that the browser screen is changed, the control portion 20 returns the process to step S25 to continue the obtaining of the browser screen data. When a difference indicating that the browser screen is changed is obtained and it is determined that the browser screen is changed, the control portion 20 moves the process to step S27.

The control portion 20 obtains the execution result of the operation processing on the web server 4 (step S27). Specifically, the control portion 20 obtains the image data of the browser screen. The image data includes at least one of the image data of the browser screen responsive to the execution instruction and the image data of the browser screen responsive to the detection of an automatic change of the screen. The control portion 20 outputs to the server 1 the image data of the execution result obtained through the communication portion 22 (step S29).

The control portion 20 determines whether the series of scenario operation processing is ended or not (step S31). When not all of the obtained operation processing is executed and it is not determined that the operation processing is ended (S31: NO), the control portion 20 returns the process to step S19 to perform the loop processing, and continues the obtaining of an execution instruction related to the series of scenario operation processing. On the other hand, when all of the obtained operation processing is executed and it is determined that the operation processing is ended (S31: YES), the control portion 20 ends the series of operations.

While an example in which the execution result is outputted as image data is described in the present embodiment, the execution result is not limited only to image data. As the execution result, a path may be outputted in addition to image data or HTML-format data may be outputted. The control portion 20 may obtain an operation log and output the obtained operation log to the server 1. Moreover, the obtaining of the execution instruction and the outputting of the image data are not necessarily performed every operation processing but a predetermined number of operation processing may be transmitted or received at a time. In a case where a plurality of pieces of image data are transmitted at a time, the control portion 20 may output, together with the image data, meta data such as the image ID to identify the image data and information on the operation instruction associated with the image ID.

When error information on the operation processing of the scenario is obtained, the control portion 20 may output information related to the error information together with the image data at step S29. The control portion 20, for example, obtains the error part or the error contents from the browser 2*a* and outputs them to the server 1 together with the image data. The control portion 20, for example, obtains the cause of occurrence of the error from the browser 2*a*. The control portion 20 outputs, to the server 1, information to identify by which of the web server 4, the scenario, the present browser control program 210, the browser control device 2 and the like the error is caused, together with the image data. Further, the control portion 20 may output notification information representative of the occurrence of the error to the server 1 or the user terminal device 3.

In the present embodiment, the browser control device 2, the user terminal device 3 and the web server 4 may each be provided more than one in number. In this case, the browser control devices 2 and the user terminal devices 3 may be connected to different private networks.

When more than one browser control device 2 is provided, the server 1 specifies the browser control device 2 to which an operation instruction is outputted, and outputs an operation instruction to the specified browser control device 2. When a specific browser control device 2 is specified as the target of the operation processing, the server 1 outputs an operation instruction to the specified browser control device 2. When no target of the operation processing is specified, the server 1 specifies the browser control device 2 to be caused to execute the scenario, based on the load status of each browser control device 2. The server 1 selects the browser control device 2 to be caused to execute a new operation processing, based on the information to identify each browser control device 2 obtained at the time of establishment of the connection and the status of the scenario execution instruction to each browser control device 2, and outputs an operation instruction. In a case where the operation instruction is not normally received because of an error or the like when the operation instruction is outputted to a predetermined browser control device 2, the server 1 selects an alternative browser control device 2 and outputs an operation instruction. The server 1 functions as a load balancer that allocates the scenario operation processing and distributes the load of the browser control devices 2.

According to the present embodiment, bidirectional communication is enabled by the connection 61 being established between the server 1 on the global network N2 and the browser control device 2 in the private network N1. Consequently, various pieces of information related to the operation processing of the scenario can be push-transmitted from the server 1 to the browser control device 2 at an arbitrary timing.

The connection 61 is established in the application layer. Since the connection is established in a higher layer of the OSI reference model, security at the time of communication can be improved. As the operation instruction related to the operation processing from the server 1 using the connection 61, only a telegraphic message conforming to the Websocket protocol can be transmitted. Therefore, the range of the transmitted information is limited with respect to the access from the global network N2, so that the risk of occurrence of vulnerability can be reduced. Moreover, depending on the security setting condition of the network environment on the side of the user receiving the service, in accesses from devices on the global network N2 to the private network N1, there are cases where protocols other than the HTTP protocol are blocked as unauthorized accesses. In the present embodiment, since the Webstock protocol defined as an extended standard of the HTTP protocol is used, the establishment of the connection 61 is easily realized.

According to the present embodiment, the scenario operation processing on the web server 4 is executed by using the browser 2*a* on the browser control device 2, and to the server 1 and the user terminal device 3, the image data of the execution result is transmitted. Since the browser control device 2 and the web server 4 are connected by the private network N1, transmission and reception of information with security being ensured are possible. Moreover, the load on the server 1 can be reduced by using the browser function by resources of the browser control device 2.

While an example in which a series of operation processing is executed by using the browser function on the browser control device 2 is described in the above, the present embodiment is not limited thereto. For example, the following may be performed: Transmission and reception of information are performed between the browser control device 2 and another information processing device communicably connected by the private network N1, and access to the web server 4 is executed from a browser of the information processing device. The present embodiment is applicable not only to a case where the scenario is automatically executed but also to a case where scenario data is recorded.

Second Embodiment

Figure 7:
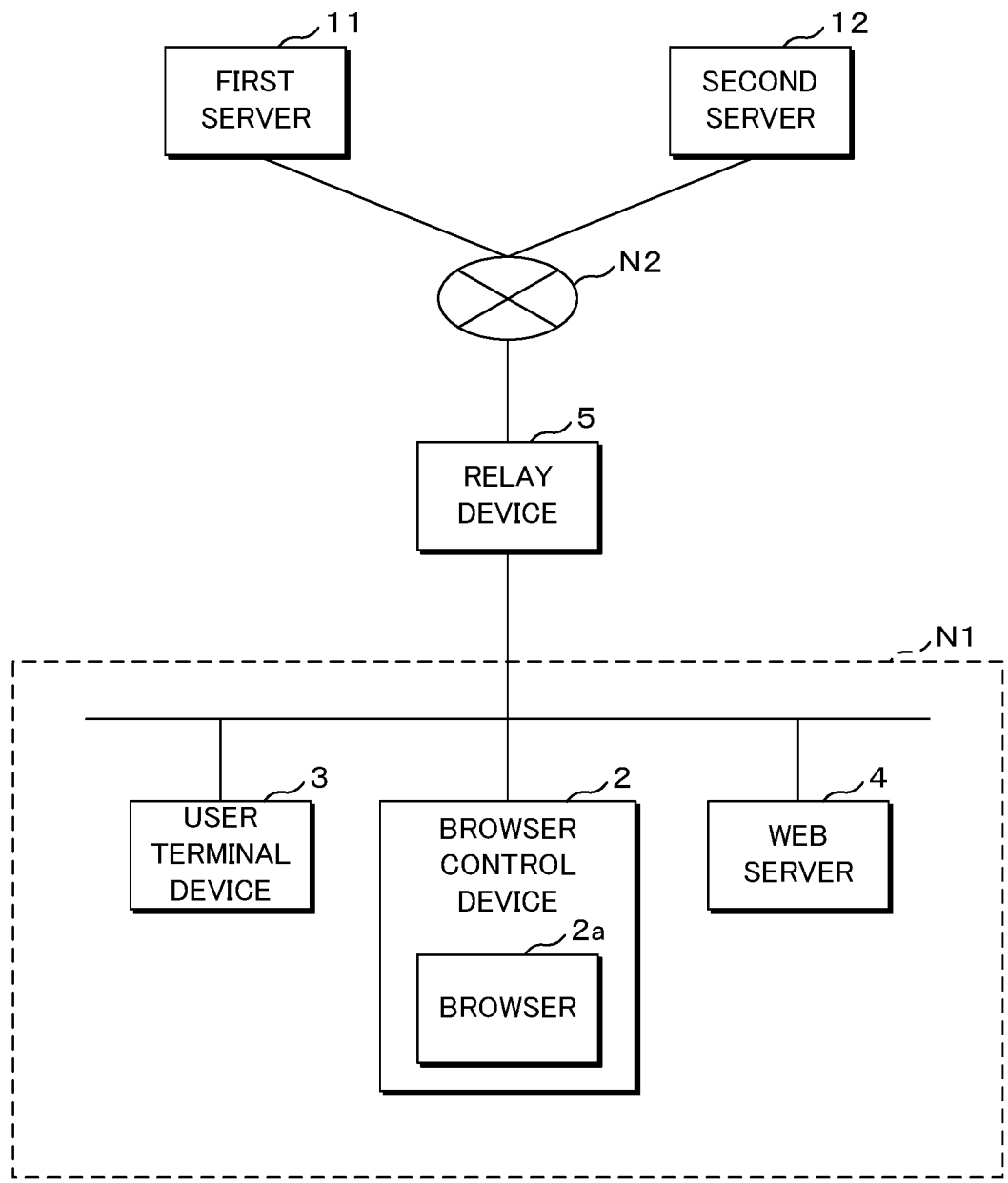
FIG. 7 is a view showing a general outline of an information processing system in a second embodiment.

A second embodiment is different from the first embodiment in that the processing performed by the server 1 of the first embodiment is shared by a first server and a second server. FIG. 7 is a view showing a general outline of an information processing system 200 in the second embodiment. Since the structure of the information processing system 200 in the second embodiment is similar to that in the first embodiment except that the first server 11 and the second server 12 are included instead of the server 1 and that details of the processing executed by the information processing system 200 are different, common components are denoted by the same reference designations and detailed descriptions thereof are omitted.

The first server 11 and the second server 12 are each connected to the global network N2 such as the Internet, are communicably connected with the private network N1 through the relay device 5, and can transmit and receive information. Moreover, the first server 11 and the second server 12 are communicably connected through the global network N2 and are capable of transmitting and receiving information. The first server 11 and the second server 12 are, for example, server computers, respectively.

Figure 8:
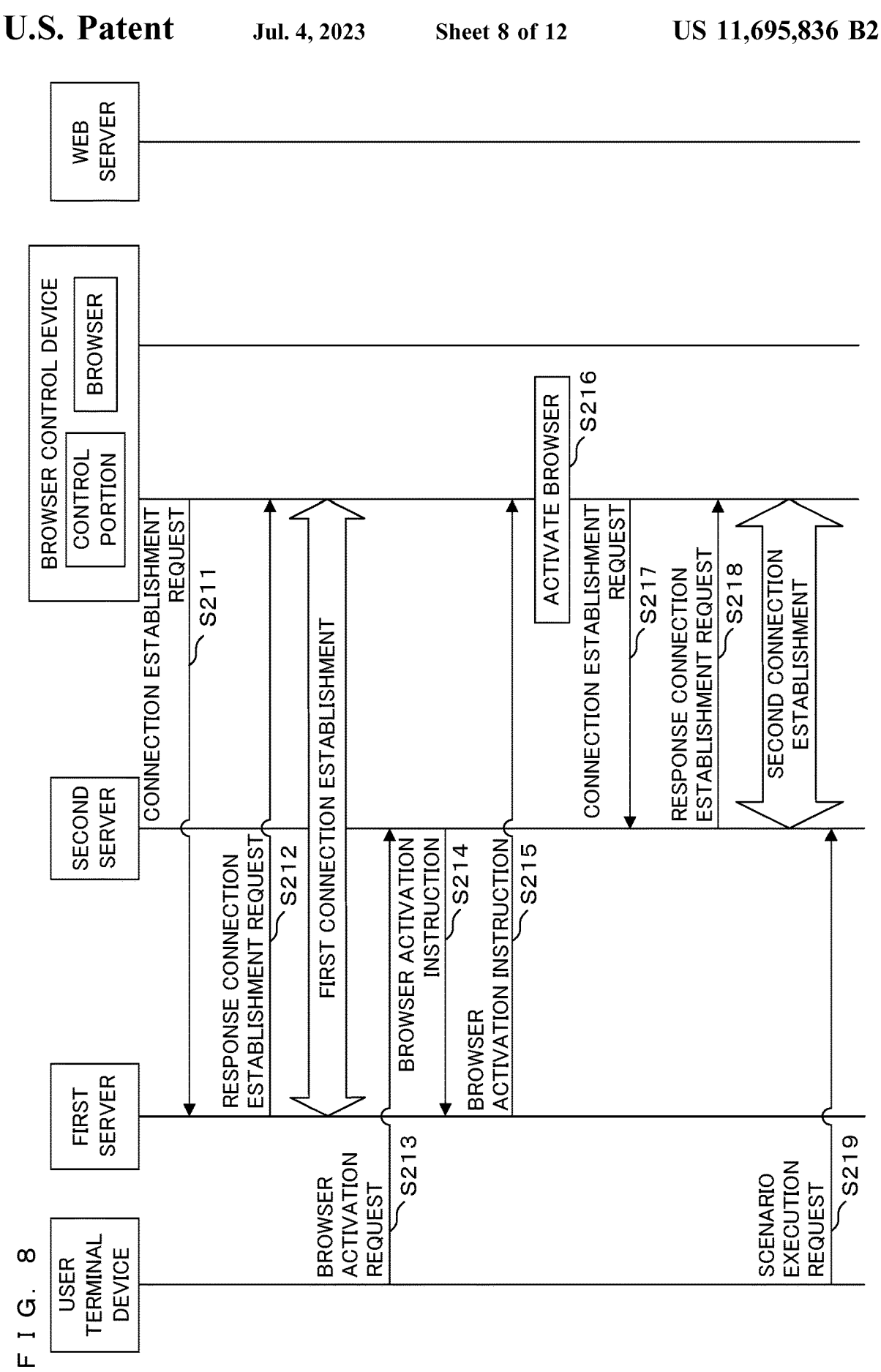
FIG. 8 is a sequence diagram showing an example of the procedure of an operation executed in the information processing system.
Figure 9:
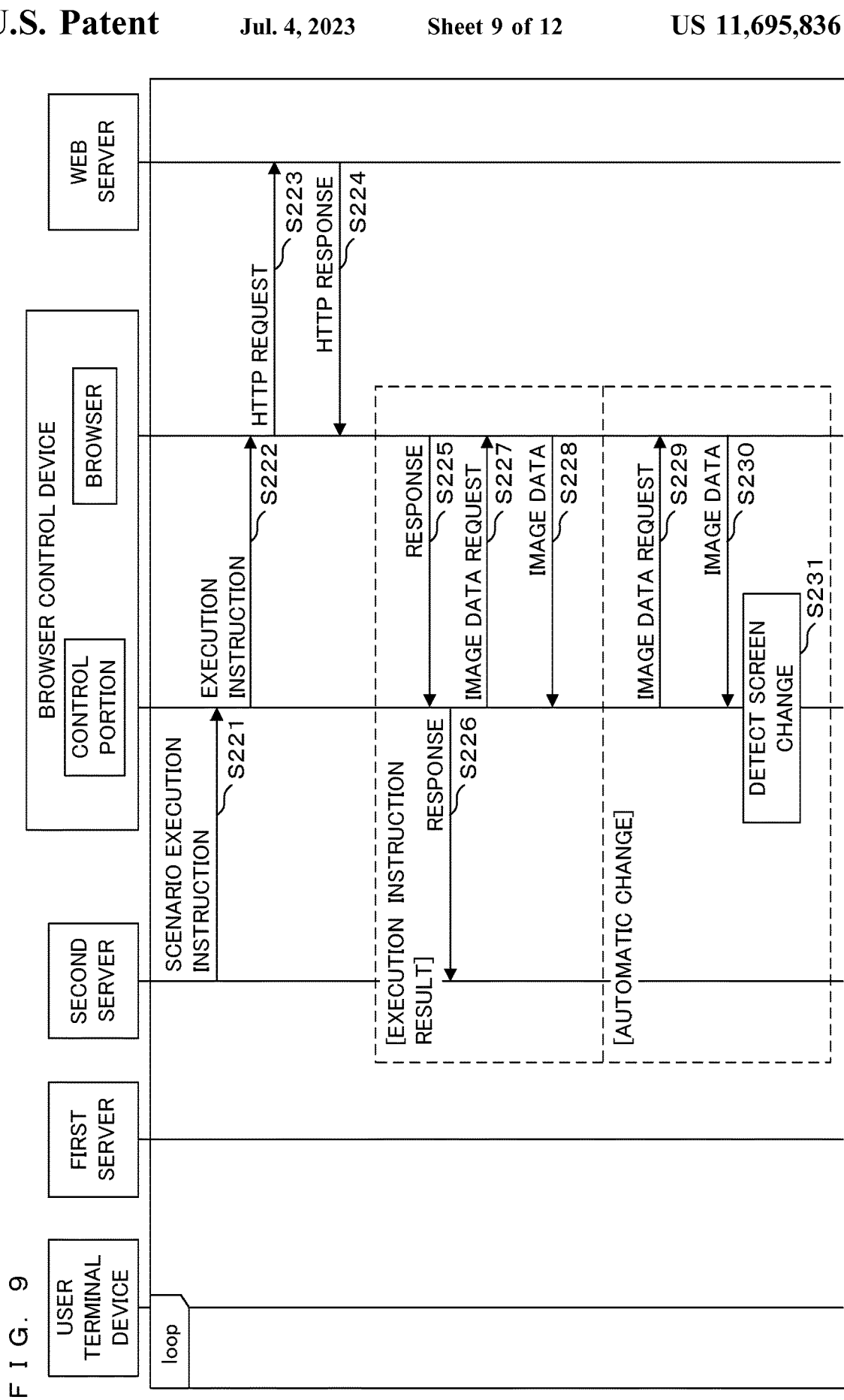
FIG. 9 is a sequence diagram showing the example of the procedure of the operation executed in the information processing system.
Figure 10:
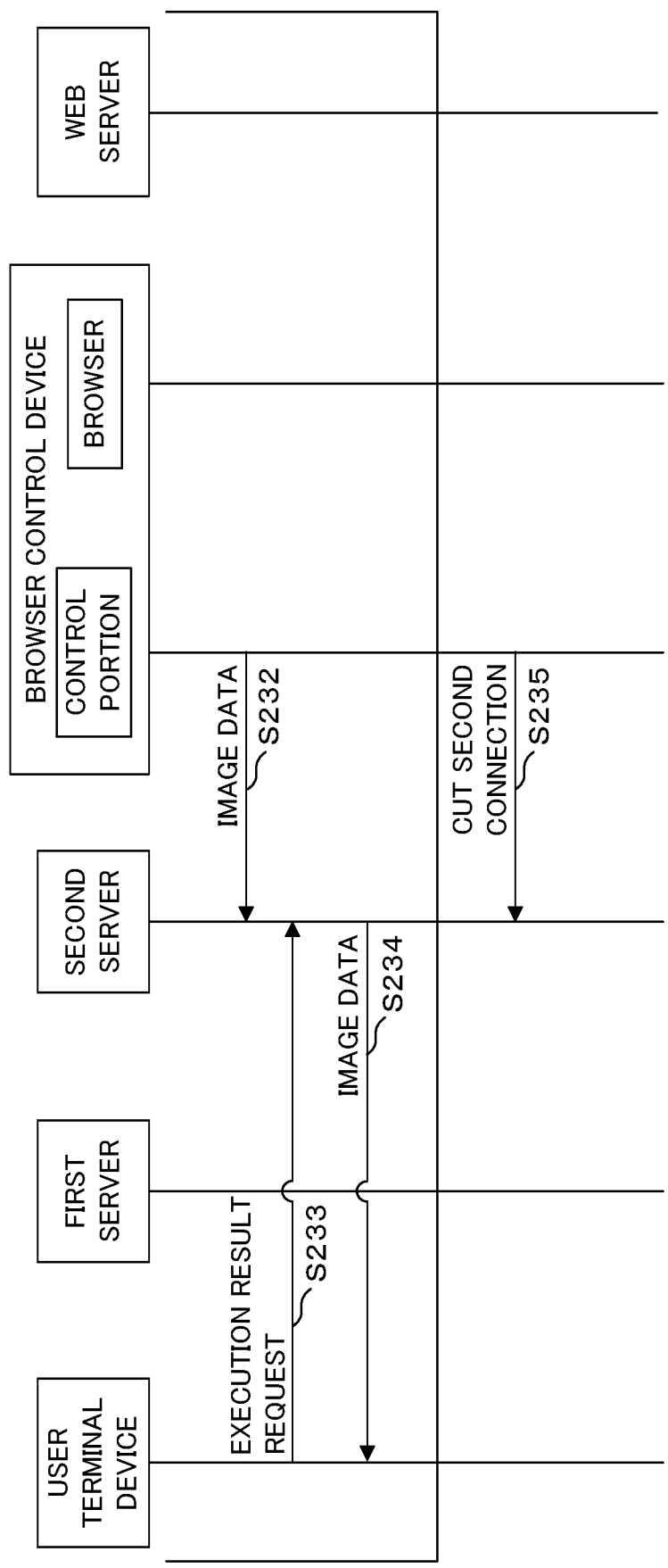
FIG. 10 is a sequence diagram showing the example of the procedure of the operation executed in the information processing system.

In the second embodiment, an activation instruction of the browser 2*a* is outputted from the first server 11, and an execution instruction of the operation processing is outputted from the second server 12. FIGS. 8 to 10 are sequence diagrams showing an example of the procedure of an operation executed in the information processing system 200.

When the browser control device 2 is activated, the browser control device 2 transmits a request for the establishment of the connection 61, to the first server 11 through the global network N2 (step S211). The establishment request is made according to the HTTP protocol, and a protocol upgrade to Websocket, that the request is from the browser control device 2, and the like are indicated. The first server 11 transmits a response to the connection establishment request (step S212). Thereby, a first connection 62 according to the Websocket protocol is established between the first server 11 and the browser control device 2, which enables bidirectional communication. The first connection 62 is established with the activation of the browser control device 2 as the trigger.

The user terminal device 3 requests for automatic execution of the scenario. The user terminal device 3 first transmits a request for the activation of the browser 2a to the second server 12 (step S213). From the user terminal device 3, for example, identification information of the user terminal device 3 is transmitted together with the activation request. When receiving the request for the activation of the browser 2a, the second server 12 transmits an activation instruction to the first server 11 (step S214). The first server 11 prestores a table, associating with each other the user terminal device 3 that requests automatic execution of the scenario and the browser control device 2 to be caused to execute the operation processing in response to the request from the user terminal device 3. The first server 11 reads from the table the browser control device 2 to which an activation instruction is to be transmitted, and push-transmits an activation instruction of the browser 2a to the read browser control device 2 through the first connection 62 (step S215). Since the first connection 62 is established between the first server 11 and the browser control device 2, push transmission of information from the first server 11 having traversed NAT to the browser 2a control device is possible.

The browser control device 2 receives the activation instruction and activates the browser 2a (step S216). Since a series of scenario operations is automatically executed without the operations being directly accepted in the browser control device 2, the browser 2a to be activated may be a headless browser 2a.

Further, when receiving the activation instruction, the browser control device 2 transmits a request for the establishment of a second connection 63, to the second server 12 to the global network N2 (step S217). The establishment request is made according to the HTTP protocol, and a protocol update to Websocket, that the request is from the browser control device 2, and the like are indicated. The second server 12 transmits a response to the received request for the establishment of the second connection 63 (step S218). Thereby, the second connection 63 according to the Websocket protocol is established between the second server 12 and the browser control device 2, which enables bidirectional communication. The second connection 63 is established with the obtaining of the activation instruction at the browser control device 2 as the trigger.

The user terminal device 3 transmits a scenario execution request to the second server 12 (step S219). The second server 12 receives the scenario execution request. The second server 12 push-transmits a scenario execution instruction to the browser control device 2 through the already established second connection 63 (step S221).

The browser control device 2 receives the execution instruction. The browser control device 2 executes the operation processing of the browser 2a based on the message of the execution instruction (step S222). The browser 2a transmits an HTTP request to the web server 4 (step S223), and obtains an HTTP response (step S224). The browser control device 2 obtains a response of the browser 2a to the operation processing (step S225), and transmits the obtained response to the second server 12 (step S226). The browser control device 2 requests image data of the browser screen including the web page according to the operation processing on the web server 4 (step S227). The browser control device 2 obtains the execution result as the image data of the browser screen (step S228).

Further, the browser control device 2 detects changes of the browser screen. The browser control device 2 requests the image data of the browser screen including the web page at a predetermined timing (step S229), and obtains the image data (step S230). The browser control device 2 detects the change of the screen based on the difference from the previous screen (step S231).

The browser control device 2 transmits the obtained image data of the execution result, the HTML source and the like to the second server 12 (step S232). When it is desired to obtain the execution result, the user terminal device 3 transmits a request for the execution result to the second server 12 (step S233). The second server 12 transmits the received image data of the screen of the execution result to the user terminal device 3 as a response to the transmission request (step S234). The user terminal device 3 is capable of obtaining the execution result according to the selected scenario as image data.

The loop processing from steps S221 to S234 is performed, and a series of scenario operation processing is executed. When the series of scenario operation processing is ended, the browser control device 2 cuts the communication with the second server 12 (step S235). Thereby, the second connection 63 is cut.

Figure 11:
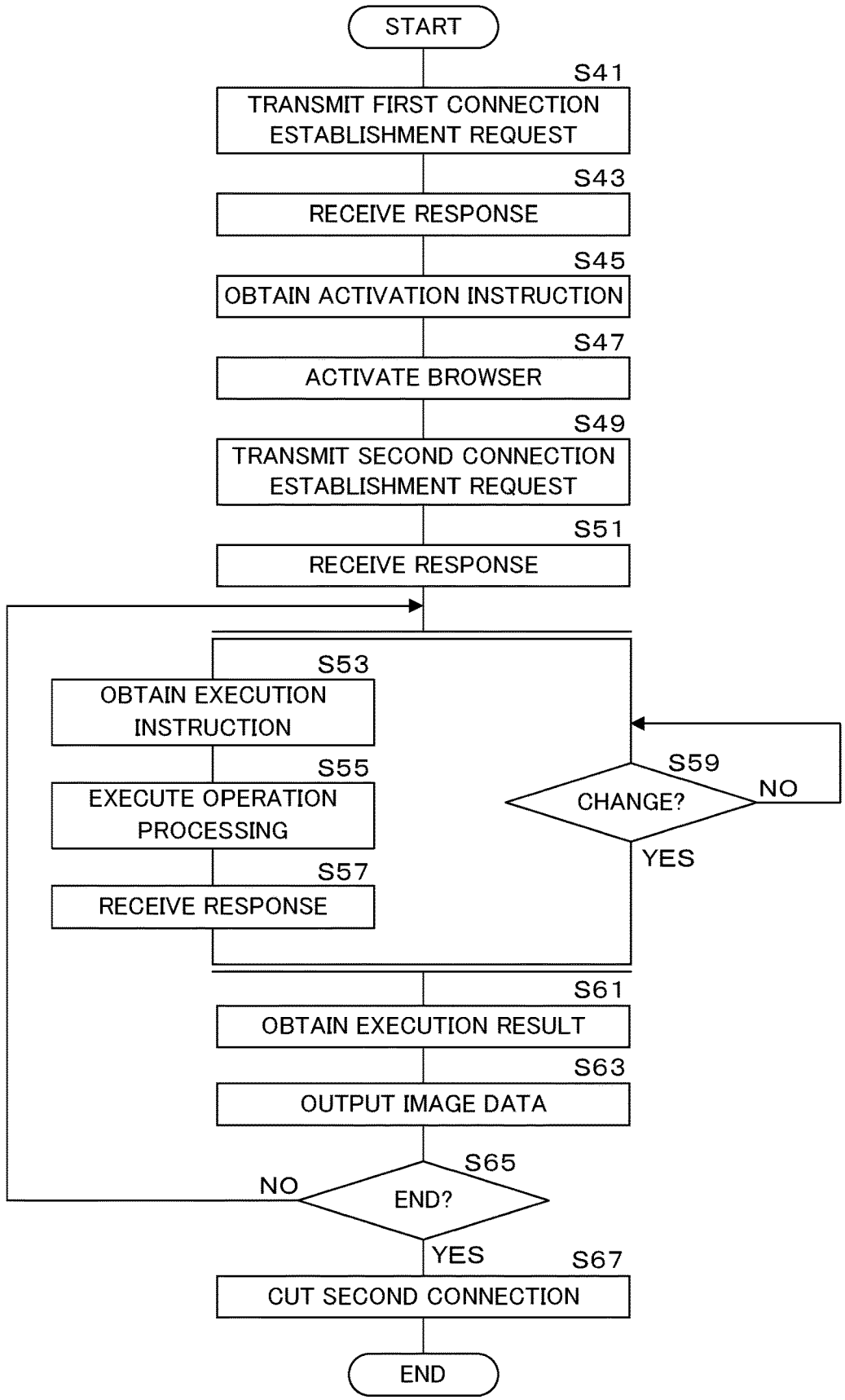
FIG. 11 is a flowchart showing an example of the procedure of the processing executed in the information processing system.

FIG. 11 is a flowchart showing an example of the procedure of the processing executed in the information processing system 200. The processing of FIG. 11 is executed by the control portion 20 of the browser control device 2. The browser control device 2 automatically executes the operation processing of the browser 2a by executing the browser control program 210. The execution timing of the processing is, for example, the timing when the browser control device 2 is activated.

The control portion 20 transmits a request for the establishment of the first connection 62 to the first server 11 through the communication portion 22 (step S41). The control portion 20 transmits a request for the establishment of the first connection 62 including information indicating that it is a request from the browser control device 2. The control portion 20 receives a response to the establishment request from the first server 11 (step S43). Thereby, the first connection 62 is established between the first server 11 and the browser control device 2.

The control portion 20 obtains an activation instruction from the first server 11 through the communication portion 22 (step S45). The activation instruction is push-transmitted from the first server 11 at a given timing through the first connection 62 by using a telegraphic message format determined in the Websocket protocol. The control portion 20 activates the browser 2a based on the obtained activation instruction (step S47). The browser 2a may be a headless browser 2a activated in the background.

The control portion 20 transmits a request for the establishment of the second connection 63 to the second server 12 through the communication portion 22 with the obtaining of an activation instruction as the trigger (step S49). The control portion 20 receives a response to the establishment request from the second server 12 (step S51). Thereby, the second connection 63 is established between the second server 12 and the browser control device 2.

The control portion 20 obtains an execution instruction from the second server 12 through the communication portion 22 (step S53). The execution instruction is push-transmitted from the second server 12 at a given timing through the second connection 63 by using a telegraphic message format determined in the Websocket protocol. Based on the execution instruction, the control portion 20 accesses the web server 4 through the communication portion 22 to execute the operation processing of the scenario (step S55), and obtains a response (step S57).

The control portion 20 causes a subprocess, and performs the processing of step S59 in parallel with the processing of step S53. The control portion 20 obtains the browser screen data of the web page displayed on the browser 2a at a predetermined timing, and compares the obtained current screen data with the previous screen data. The control portion 20 derives the difference between the current screen data and the previous screen data, and determines whether the browser screen is changed or not based on the derived difference (step S59). When a difference indicating that the browser screen is changed is not obtained and it is not determined that the browser screen is changed (step S59: NO), the control portion 20 returns the process to step S59 to continue the obtaining of the browser screen data. When a difference indicating that the browser screen is changed is obtained and it is determined that the browser screen is changed (step S59: YES), the control portion 20 moves the process to step S61.

The control portion 20 obtains the execution result of the operation processing on the web server 4 (step S61). Specifically, the control portion 20 obtains the image data of the browser screen. The control portion 20 outputs to the second server 12 the image data of the execution result obtained through the communication portion 22 (step S63).

The control portion 20 determines whether the series of scenario operation processing is ended or not (step S65). When not all of the obtained operation processing is executed and it is not determined that the operation processing is ended (S65: NO), the control portion 20 returns the process to step S53 to perform the loop processing, and continues the obtaining of an execution instruction related to the series of scenario operation processing. On the other hand, when all of the obtained operation processing is executed and it is determined that the operation processing is ended (S65: YES), the control portion 20 cuts the communication with the second server 12 (step S67) and ends the series of operations.

In the present embodiment, since the instruction related to the operation processing of the scenario is shared by using the first server 11 and the second server 12, the load on each server can be further reduced.

Third Embodiment

In a third embodiment, an example will be described in which a series of automatic execution service from automatic execution of an operation processing to recording of a scenario is provided on a plurality of servers. FIG. 12 is a view showing a general outline of an information processing system 300 in the third embodiment. Components in common with the first embodiment and the second embodiment are denoted by the same reference designations and detailed descriptions thereof are omitted.

The information processing system 300 includes a first server 13, a second server 14, a third server 15, a fourth server 16, a scenario database 17, the browser control device 2, the user terminal device 3, the web server 4 and the relay device 5. In FIG. 12, the relay device 5 and the global network N2 are not shown. The first server 13, the second server 14, the third server 15 and the fourth server 16 are each connected to the global network N2, are communicably connected with the private network N1 through the relay device 5, and are capable of transmitting and receiving information. The first server 13, the second server 14, the third server 15 and the fourth server 16 are each, for example, a server computer. In the third embodiment, the processing of the second server 12 in the second embodiment is performed by the second server 14, the third server 15 and the fourth server 16.

First, the browser control device 2 transmits a request for the establishment of the first connection 62 to the first server 13, and establishes the first connection 62 between the browser control device 2 and the first server 13.

The user terminal device 3 transmits a request for the activation of the browser 2a to the second server 14. The second server 14 transmits the request for the activation of the browser 2a to the first server 13. Based on the received activation request, the first server 13 push-transmits an activation instruction of the browser 2a to the browser control device 2 by using the first connection 62.

With the obtaining of the activation instruction as the trigger, the browser control device 2 transmits a request for the establishment of the second connection 63 to the second server 14, and establishes the second connection 63 with the browser control device 2 and the second server 14.

The user terminal device 3 transmits a request for the execution of the scenario to the second server 14. Based on the received execution request, the second server 14 push-transmits a scenario execution instruction to the browser control device 2 by using the second connection 63.

The browser control device 2 executes the operation processing of the browser 2a. Specifically, the browser control device 2 accesses the web server 4 and obtains an access result. The browser control device 2 obtains image data of the execution result of the operation processing, and transmits the obtained image date to the second server 14. The second server 14 transmits the obtained image data to the user terminal device 3.

The user terminal device 3 obtains the image data of the execution result screen. Further, the user terminal device 3 accumulates the scenario which is the procedure data of the executed operation processing. The user terminal device 3 transmits a request to store the accumulated series of scenarios to the fourth server 16. The fourth server 16 stores the received scenario in the scenario database 17. Thereby, the scenario is recorded.

Based on the recorded scenario, when the operation processing is executed at a predetermined timing without regard to the request from the user terminal device 3, the third server 15 obtains the scenario with reference to the scenario database 17. The third server 15 transmits the read scenario execution request to the second server 14. The second server 14 transmits a scenario execution instruction to the browser control device 2, and the above-described operation processing is executed.

Fourth Embodiment

The communication method in the above-described embodiments is not limited to the one according to the Websocket. The connection 61, the first connection 62 and the second connection 63 may use another communication method such as polling or long polling instead of the one according to Websocket. For example, the method may be such that by using polling, the browser control device 2 periodically or steadily makes an inquiry to the server 1 (the first server 11 and the second server 12) at predetermined intervals and obtains a response push-transmitted from the server 1 in response to the inquiry. When an update of the operation instruction at the server 1 occurs during the predetermined interval, the browser control device 2 can obtain information related to the update of the operation instruction based on the response from the server 1. By using polling, forward setting and the like on the relay device 5 are made unnecessary, so that communication between the server 1 and the browser control device 2 can be performed with security being ensured. When communication is performed by long polling, since connection is periodically cut, it is desirable to perform session management or the like so that the browser control device 2 can be uniquely identified.

It is to be noted that, as used herein and in the appended claims, the singular forms "a", "an", and "the" include plural referents unless the context clearly dictates otherwise.

It should be considered that the embodiments disclosed as described above are illustrative in all aspects and are not limitative. The technical features described in the embodiments may be combined together, and it is intended that all changes within the claims and the scope equivalent to the claims are embraced by the scope of the present invention.

The invention claimed is:

1. A non-transitory computer readable recording medium storing a computer program for causing an information processing device connected to a private network, to automatically execute operation processing of a browser that accesses a web server on the private network, based on an instruction from a server connected to a global network, the computer program causing the information processing device to execute the processing of:
   requesting, by the information processing device, the server to establish a connection for connecting the information processing device and the server,
      wherein the server is located in the global network, the information processing device and the web server are located in the private network, the information processing device is configured to access the server via a relay device, wherein the relay device is provided between the private network and the global network, and
      wherein establishing the connection between the information processing device and the server via the relay device comprises enabling the server to conduct push-type communication to the information processing device, the information processing device comprising the browser, wherein the information processing device is configured to automatically execute the operation processing of the browser for accessing the web server based on an operation instruction from the server;
   obtaining, by the information processing device, the operation instruction related to the operation processing which is push-transmitted from the server, by using the connection established by obtaining a response from the server, the operation processing comprising accessing the web server on the private network, the connection comprising communication established across NAT or NAPT environments;
   executing, by the information processing device, the operation processing of the browser based on the obtained operation instruction, wherein the operation processing of the browser comprises transmitting data on the private network between the browser and the web server, wherein such data is generated based at least in part on automatically executing the operation processing by the information processing device;
   obtaining, by the information processing device, an execution result of the operation processing, the execution result of the operation processing comprising a result based at least in part on executing, by the information processing device, the operation processing of the browser; and
   outputting, by the information processing device, the obtained execution result to the server, the execution result being based on the operation instruction push-transmitted from the server.

2. The recording medium according to claim 1, wherein the connection is established in an application layer.

3. The recording medium according to claim 1, wherein the connection is based on Websocket.

4. The recording medium according to claim 1, wherein the operation instruction includes an activation instruction of the browser and an execution instruction of the operation processing.

5. The recording medium according to claim 1, wherein the server includes a first server that transmits an activation instruction of the browser and a second server that transmits an execution instruction of the operation processing, and
   the connection includes a first connection and a second connection,
   the computer program causing the information processing device to execute the processing of:
      requesting the first server to establish the first connection;
      obtaining the activation instruction push-transmitted from the first server, by using the first connection;
      activating the browser based on the obtained activation instruction;
      requesting the second server to establish the second connection;
      obtaining the execution instruction push-transmitted from the second server, by using the second connection; and
      executing the operation processing of the browser based on the obtained execution instruction.

6. The recording medium according to claim 5, the computer program causing the information processing device to execute the processing of:
   requesting to establish the second connection when the activation instruction is obtained; and
   cutting the second connection when the operation processing executed based on the execution instruction is ended.

7. The recording medium according to claim 1, wherein the execution result includes image data of a screen to be displayed on the browser according to the operation processing.

8. The recording medium according to claim 1, wherein the execution result includes image data responsive to a change of the screen to be displayed on the browser.

9. The recording medium according to claim 1, wherein the execution result includes error information or timeout information to the operation processing.

10. An information processing method for causing an information processing device connected to a private network, to automatically execute operation processing of a browser that accesses a web server on the private network, based on an instruction from a server connected to a global network, comprising:

requesting, by the information processing device, the server to establish a connection for connecting the information processing device and the server, wherein the server is located in the global network, the information processing device and the web server are located in the private network, the information processing device is configured to access the server via a relay device, wherein the relay device is provided between the private network and the global network, and wherein establishing the connection between the information processing device and the server via the relay device comprises enabling the server to conduct push-type communication to the information processing device, the information processing device comprising the browser, wherein the information processing device is configured to automatically execute the operation processing of the browser for accessing the web server based on an operation instruction from the server;

obtaining, by the information processing device, the operation instruction related to the operation processing which is push-transmitted from the server, by using the connection established by obtaining a response from the server, the operation processing comprising accessing the web server on the private network, the connection comprising communication established across NAT or NAPT environments;

executing, by the information processing device, the operation processing of the browser based on the obtained operation instruction, wherein the operation processing of the browser comprises transmitting data on the private network between the browser and the web server, wherein such data is generated based at least in part on automatically executing the operation processing by the information processing device;

obtaining, by the information processing device, an execution result of the operation processing, the execution result of the operation processing comprising a result based at least in part on executing, by the information processing device, the operation processing of the browser; and outputting, by the information processing device, the obtained execution result to the server, the execution result being based on the operation instruction push-transmitted from the server.

11. An information processing device connected to a private network, and for being caused to automatically execute operation processing of a browser that accesses a web server on the private network, based on an instruction from a server connected to a global network, the information processing device comprising:

a processor, wherein the processor executes the processing of:

requesting, by the information processing device, the server to establish a connection for connecting the information processing device and the server, wherein the server is located in the global network, the information processing device and the web server are located in the private network, the information processing device is configured to access the server via a relay device, wherein the relay device is provided between the private network and the global network, and wherein establishing the connection between the information processing device and the server via the relay device comprises enabling the server to conduct push-type communication to the information processing device, the information processing device comprising the browser, wherein the information processing device is configured to automatically execute the operation processing of the browser for accessing the web server based on an operation instruction from the server;

obtaining, by the information processing device, the operation instruction related to the operation processing which is push-transmitted from the server, by using the connection established by obtaining a response from the server, the operation processing comprising accessing the web server on the private network, the connection comprising communication established across NAT or NAPT environments;

executing, by the information processing device, the operation processing of the browser based on the obtained operation instruction, wherein the operation processing of the browser comprises transmitting data on the private network between the browser and the web server, wherein such data is generated based at least in part on automatically executing the operation processing by the information processing device;

obtaining, by the information processing device, an execution result of the operation processing, the execution result of the operation processing comprising a result based at least in part on executing, by the information processing device, the operation processing of the browser; and outputting, by the information processing device, the obtained execution result to the server, the execution result being based on the operation instruction push-transmitted from the server.

12. An information processing system comprising: an information processing device connected to a private network, and to be accessible to a web server; and a server connected to a global network, and outputting an operation instruction related to operation processing of a browser that accesses the web server, to the information processing device by using a connection for connecting the information processing device and the server established by responding to a request from the information processing device, wherein the information processing device includes a processor, and the processor executes the processing of:

requesting, by the information processing device, the server to establish the connection wherein the server is located in the global network, the information processing device and the web server are located in the private network, the information processing device is configured to access the server via a relay device, wherein the relay device is provided between the private network and the global network, and wherein establishing the connection between the information processing device and the server via the relay device comprises enabling the server to conduct push-type communication to the information processing device, the information processing device comprising the browser, wherein the information processing device is configured to automatically execute the operation processing of the browser for accessing the web server based on an operation instruction from the server;

obtaining, by the information processing device, the operation instruction related to the operation processing which is push-transmitted from the server, by using the connection established by obtaining a response from the server, the operation processing comprising accessing the web server on the private network, the connection comprising communication established across NAT or NAPT environments;

executing, by the information processing device, the operation processing of the browser based on the obtained operation instruction, wherein the operation processing of the browser comprises transmitting data on the private network between the browser and the web server, wherein such data is generated based at least in part on automatically executing the operation processing by the information processing device;

obtaining, by the information processing device, an execution result of the operation processing, the execution result of the operation processing comprising a result based at least in part on executing, by the information processing device, the operation processing of the browser; and outputting, by the information processing device, the obtained execution result to the server, the execution result being based on the operation instruction push-transmitted from the server.

13. The information processing system according to claim 12, further comprising a user terminal device connected to the private network, wherein the server transmits the operation instruction to the information processing device when a request from the user terminal device is accepted.

* * * * *